C. HILSZ.
FISH HOOK FASTENER.
APPLICATION FILED JULY 17, 1915.
1,232,545.
Patented July 10, 1917.
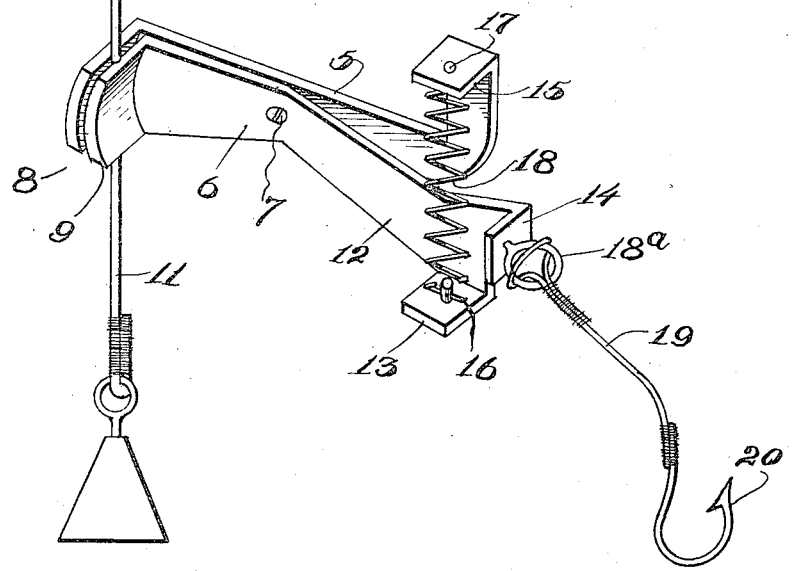
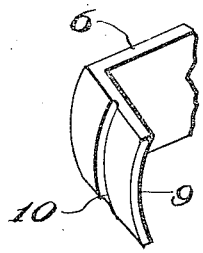
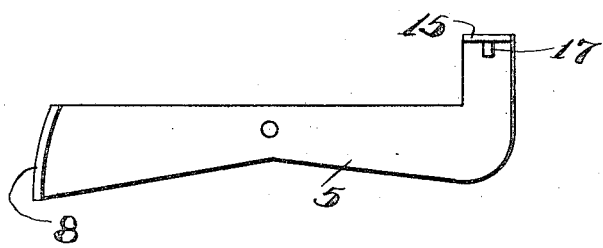
Inventor
C. Hilsz.

UNITED STATES PATENT OFFICE.

CHARLES HILSZ, OF BROOKLYN, NEW YORK.

FISH-HOOK FASTENER.

1,232,545.

Specification of Letters Patent.

Patented July 10, 1917.

Application filed July 17, 1915. Serial No. 40,443.

*To all whom it may concern:*

Be it known that I, CHARLES HILSZ, a citizen of the United States, residing at Brooklyn, in the county of Queens and State of New York, have invented certain new and useful Improvements in Fish-Hook Fasteners; and I do hereby declare the following to be a full, clear, and exact description of the invention, such as will enable others skilled in the art to which it appertains to make and use the same.

This invention relates to fasteners, and more particularly to an efficient and inexpensive device especially designed for reliably fastening a fish hook in any desired position longitudinally of a fishing line, thereby obviating the necessity of knotting the line.

With these and other objects in view, the invention consists in the novel construction, arrangement and formation of parts as will be hereinafter specifically described, claimed and illustrated in the accompanying drawing, in which:

Figure 1 represents a perspective view of the invention applied to use.

Fig. 2 represents a fragmental perspective view of the inner clamping jaw of the device.

Fig. 3 represents a side elevation of the outer jaw carrying member removed.

Referring to the drawing, wherein similar reference numerals designate corresponding parts throughout the several views, the numerals 5 and 6 indicate a pair of members pivotally secured at a point adjacent their longitudinal center by a pivot pin or screw 7. The member 5 is extended a short distance beyond one end of the member 6 and is provided with a laterally projecting jaw 8 curved eccentrically with relation to the pivotal axis 7 of the jaws and adapted to be engaged by and limit the swinging movement of an inner jaw 9 carried by and projecting laterally of the adjacent extremity of the other pivoted member 6. The inner jaw 9 is formed with a relatively shallow groove 10 to receive the fishing line 11 and insure proper positioning thereof between the jaws 8 and 9, which latter effectively clamp the line when moved together, as illustrated in Fig. 1.

The end of the pivoted member 6 opposite the jaw 9 is directed angularly or offset, as indicated at 12, and is formed with lateral and longitudinal reduced extensions 13 and 14, respectively, which are bent at right angles to the body of said member, as clearly illustrated in Fig. 1. The pivoted member 5 is bent angularly adjacent its end opposite the outer jaw 8 carried thereby and the extreme end thereof is directed angularly to provide a lateral extension 15, lying substantially parallel to the lateral extension 13 of the other pivoted member 6. The lateral extensions 13 and 15 are provided with inwardly directed anchoring pins 16 and 17, respectively, over which are engaged the opposite ends of a coil spring 18, the tension of which normally tends to actuate the pivoted members 5 and 6 to close the clamping jaws 8 and 9.

A loop or eyelet 18$^a$ is swivelly secured in the angular extension 14 of the pivoted member 6 and is designed to be attached to the leader of a fish hook 20.

In use, the fish hook 20 may be secured at any desired point longitudinally of the fishing line 11 by moving the free ends of the pivoted members 5 and 6 together, thus swinging the jaws 8 and 9 apart, permitting free movement of the line 11 therebetween. Subsequently to positioning the jaws at the desired point longitudinally of the line 11 the pressure upon the free ends of the pivoted members is released and the tension of the spring 18 automatically moves the jaws 8 and 9 into clamping engagement with the fishing line 11, thus reliably securing the fastener in adjusted position thereon. It is clearly evident that the pull exerted by a fish caught upon the hook 20 operates to move the jaws 8 and 9 together, thereby more forcibly gripping the line 11.

What I claim is:

1. In combination, a fishing line, a sinker secured to one end thereof, a fish hook fastener including clamping members for engaging the line at any point throughout its length to adjustably secure the fastener thereto, and a fish hook secured to the fastener.

2. In combination, a fishing line, a sinker secured to one end thereof, a fish hook fastener including clamping members for engaging the line at any point throughout its length to detachably and adjustably secure the fastener thereto, a fish hook and means to swively secure the fish hook to the free end of said fastener, as and for the purpose specified.

In testimony whereof I affix my signature in presence of two witnesses.

CHARLES HILSZ.

Witnesses:
GOTTFRIED SCHARLEK,
AUGUST GROB.

Copies of this patent may be obtained for five cents each, by addressing the "Commissioner of Patents, Washington, D. C."